United States Patent
Hung et al.

(10) Patent No.: US 8,410,765 B2
(45) Date of Patent: Apr. 2, 2013

(54) PULSE MODULATION CIRCUIT AND METHOD

(75) Inventors: Hsiang-Jui Hung, Taipei Hsien (TW);
Kun-Lung Wu, Taipei Hsien (TW);
Yi-Ping Li, Taipei Hsien (TW);
Yong-Xian Zhao, Shenzhen (CN);
Shi-Tao Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 295 days.

(21) Appl. No.: 12/956,681

(22) Filed: Nov. 30, 2010

(65) Prior Publication Data
US 2012/0038335 A1 Feb. 16, 2012

(30) Foreign Application Priority Data
Aug. 11, 2010 (CN) .......................... 2010 1 0250892

(51) Int. Cl.
*G05F 1/00* (2006.01)

(52) U.S. Cl. ........................................ 323/282; 323/283

(58) Field of Classification Search .................. 323/271, 323/282, 283, 284, 285
See application file for complete search history.

(56) References Cited

U.S. PATENT DOCUMENTS

| 7,629,778 | B2 * | 12/2009 | Liu | 323/222 |
| 7,884,590 | B2 * | 2/2011 | Liu | 323/282 |
| 2004/0207459 | A1 * | 10/2004 | Farkas et al. | 327/536 |
| 2009/0039851 | A1 * | 2/2009 | Fukushi et al. | 323/283 |

\* cited by examiner

*Primary Examiner* — Nguyen Tran
(74) *Attorney, Agent, or Firm* — Altis Law Group, Inc.

(57) ABSTRACT

A pulse modulation method for adjusting pulse signals according to a working voltage of a load, the method includes the following steps. The working voltage of the load is detected by a feedback terminal of a PWM controller. Whether the load is a light load or a heavy load is determined, if the load is a light load, a pulse skipping mode is entered; the voltage output to the load is detected by the feedback terminal. Whether the voltage output to the load is normal is determined, if the voltage output to the load is low, the pulse skipping mode is stayed for a number of clock cycles; the voltage output to the load is detected to determine whether the voltage is normal. If the voltage output to the load is still low, the pulse skipping mode is jumped out and a normal working mode is entered.

5 Claims, 3 Drawing Sheets

PULSE MODULATION CIRCUIT AND METHOD

BACKGROUND

1. Technical Field

The disclosure generally relates to a pulse modulation circuit and method, especially to a pulse width modulation circuit and method with steady voltage outputs.

2. Description of Related Art

Many electronic apparatuses are not equipped with internal power supply devices in order to save space and costs. Therefore, these electronic apparatuses require external power supplies. Computers are powered by power supplies, which are capable of converting alternating current into direct current. A typical power supply usually includes a pulse skipping mode, which allows the Pulse Width Modulation (PWM) controller to skip some unwanted pulse signals. This pulse skipping mode improves efficiency of the power supply when provides power to a light load. However, the PWM controller cannot rapidly switch to the normal working mode when providing power to a heavy load, which leads to a low voltage output of the power supply.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
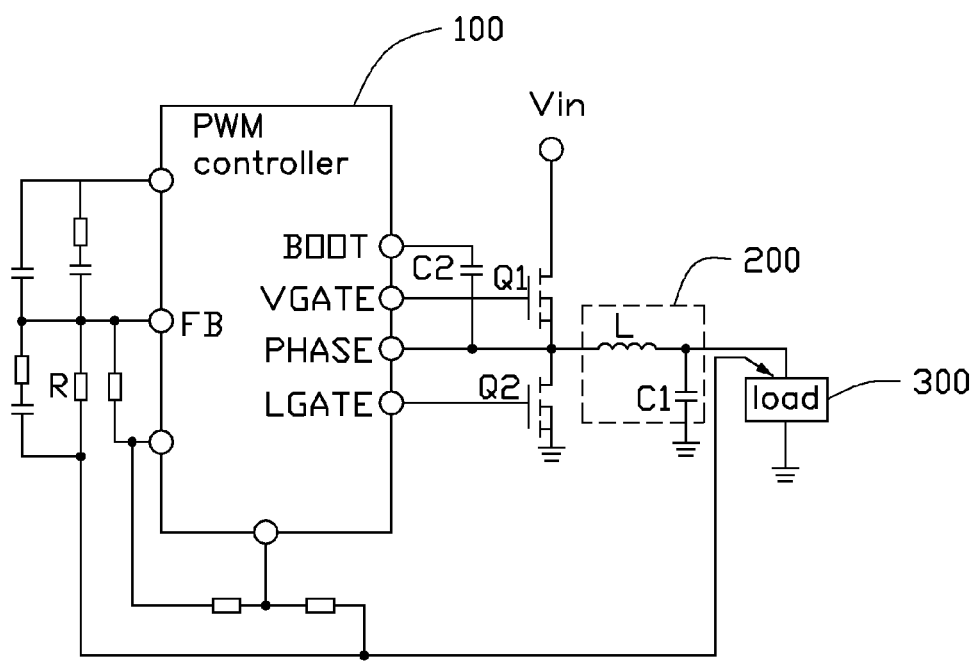
FIG. 1 is a circuit view of an embodiment of a pulse modulation circuit.

Referring to FIG. 1, an embodiment of a pulse modulation circuit for adjusting pulse signals according to the working voltage of a load 300 includes a Pulse Width Modulation (PWM) controller 100, a filter circuit 200, a first switch Q1 and a second switch Q2.

The PWM controller 100 includes a boot terminal, BOOT, a first drive terminal, UGATE, a phase terminal, PHASE, a second drive terminal, LGATE and a feedback terminal, FB. The PWM controller 100 detects the working voltage of the load 300 with the feedback terminal FB. The PWM controller 100 outputs a first control signal and a second control signal to the first and second switches Q1, Q2 respectively at the first and second drive terminals UGATE, LGATE, according to the detected working voltage. The first and second switches Q1, Q2 turn on according to the received control signals. The phase terminal PHASE generates the working voltage for the load 300 between the first and second switches Q1, Q2.

The filter circuit 200 includes an inductor L and a capacitor C1. The first and second switches Q1, Q2 are N-channel MOSFETs. The boot terminal BOOT is electrically connected to the phase terminal PHASE by a capacitor C2. The first and second drive terminals UGATE, LGATE are electrically connected to the first and second switches Q1, Q2 grids respectively. A first switch Q1 drain receives an input voltage Vin. A first switch Q1 source and a second switch Q2 drain are electrically connected to an inductor L first terminal. A second switch Q2 source is grounded. An inductor L second terminal is grounded by the capacitor C1. A connection point between the inductor L and the capacitor C1 outputs the working voltage for the load 300. The feedback terminal FB is electrically connected to a load 300 input terminal by a resistor R to detect an input voltage of the load 300.

Figure 2:
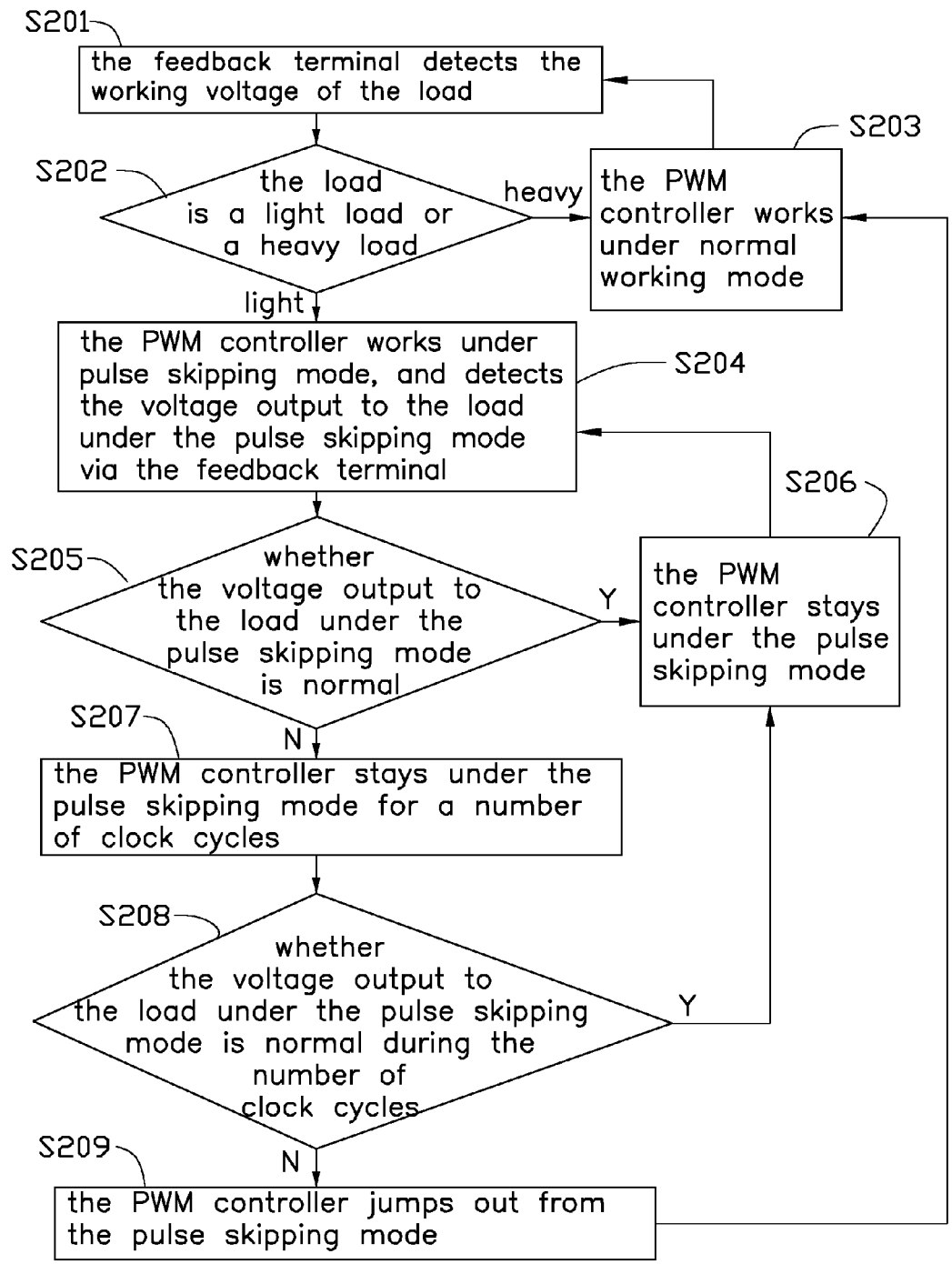
FIG. 2 is a flow chart of an embodiment of a pulse modulation method for adjusting voltage output to a load.

FIG. 2 is a flow chart illustrating a pulse modulation method for adjusting the voltage output to the load 300. Depending on the embodiment, certain steps described below may be removed, while others may be added, and the sequence of the steps may be altered. In one embodiment, the method for adjusting the voltage output to the load 300 utilizing the above-described pulse modulation circuit includes the following steps:

S201: the feedback terminal FB detects the working voltage of the load 300;

S202: the PWM controller 100 determines the load 300 is a light load or a heavy load; if the load 300 is a heavy load, then go to step S203; and if the load 300 is a light load, then goes to step S204;

S203: the PWM controller 100 works under normal working mode, then goes back to step S201;

S204: the PWM controller 100 works under pulse skipping mode, and detects the voltage output to the load 300 under the pulse skipping mode by the feedback terminal FB;

S205: the PWM controller 100 determines whether the voltage output to the load 300 under the pulse skipping mode is normal; if the voltage is normal, then goes to step S206; and if the voltage is low, then go to step S207;

S206: the PWM controller 100 stays under the pulse skipping mode, then goes back to step S204;

S207: the PWM controller 100 stays under the pulse skipping mode for a number of clock cycles, and goes on detecting the voltage output to the load 300 with the feedback terminal FB;

S208: the PWM controller 100 determines whether the voltage output to the load 300 under the pulse skipping mode is normal during the number of clock cycles; if the voltage is normal, then goes back to step S206; and if the voltage is still low, then goes to step S209;

S209: the PWM controller 100 jumps out from the pulse skipping mode, then goes back to step S203.

In step S204, the PWM controller 100 turns on the first switch Q1 or the second switch Q2 to enter the pulse skipping mode. In step S207, the PWM controller 100 stays under the pulse skipping mode for 32 clock cycles.

Figure 3:
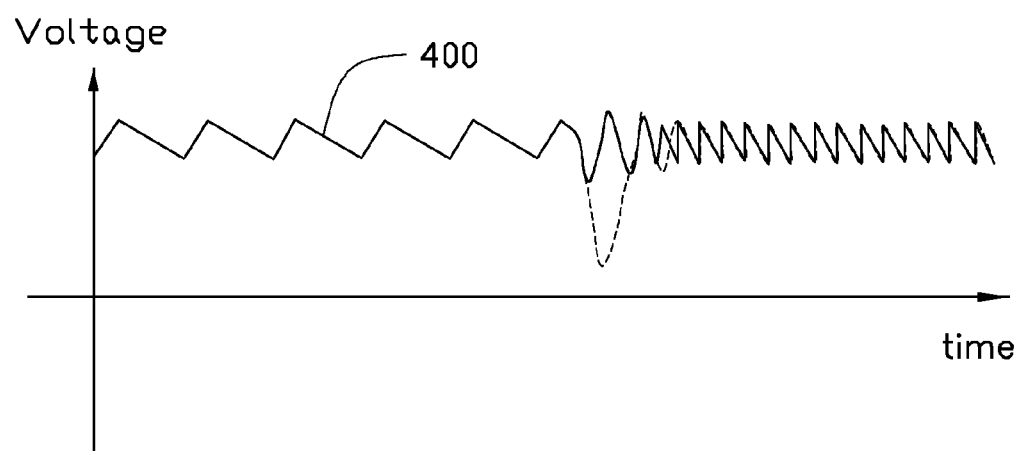
FIG. 3 is a comparative graph showing signal waveforms obtained at an input terminal of the load of FIG. 1.
Figure 3:
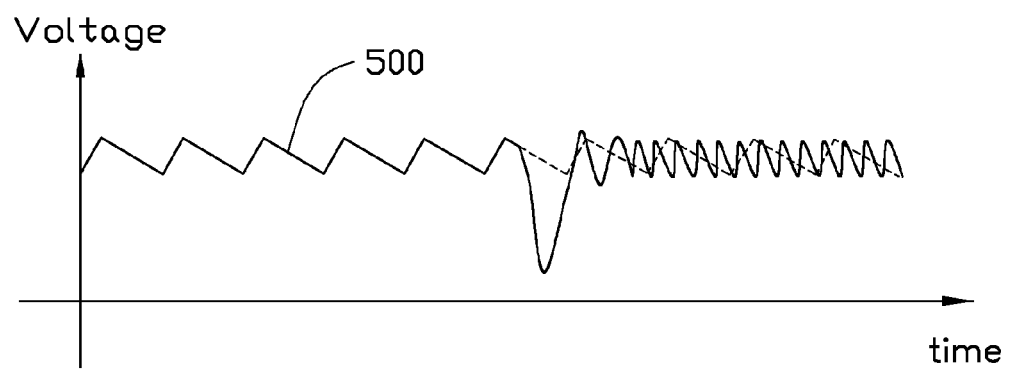

Referring to FIG. 3, signal waveform 400 is an input voltage comparative graph obtained at the input terminal of the load 300 using the pulse modulation method of the embodiment, and signal waveform 500 is an input voltage comparative graph obtained at the input terminal of the load 300 using a typical pulse modulation method. The comparative graph shows that under the typical pulse modulation method, the input voltage of the load 300 largely drops when the load 300 switches from light load to heavy load. And under the pulse modulation method of the embodiment, the PWM controller 100 stays under the pulse skipping mode for a number of clock cycles to detect the voltage output to the load 300. The PWM controller 100 jumps out from the pulse skipping mode to enter the normal working mode when the voltage output to the load 300 is too low. Thus, a steady voltage output to the load 300 is ensured when it provides power to a heavy load.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A pulse modulation method for adjusting pulse signals according to a working voltage of a load, the method comprising:
   detecting the working voltage of the load by a feedback terminal of a PWM controller;
   determining the load is a light load or a heavy load by the PWM controller; and if the load is a heavy load, the PWM controller works under normal working mode, and continues to detect the working voltage of the load;
   if the load is a light load, the PWM controller works under pulse skipping mode, and detects the voltage output to the load under the pulse skipping mode with the feedback terminal; and
   ascertaining whether the voltage output to the load under the pulse skipping mode is normal by the PWM controller; and if the voltage output to the load under the pulse skipping mode is normal, the PWM controller stays under the pulse skipping mode, and continues to detect the voltage output to the load under the pulse skipping mode with the feedback terminal;
   wherein if the voltage output to the load under the pulse skipping mode is low, the PWM controller stays under the pulse skipping mode for a number of clock cycles, and continues to detect the voltage output to the load under the pulse skipping mode with the feedback terminal; if the voltage is normal, the PWM controller stays under the pulse skipping mode, and continues to detect the voltage output to the load under the pulse skipping mode with the feedback terminal; and if the voltage output to the load under the pulse skipping mode is still low, the PWM controller jumps out from the pulse skipping mode to work under the normal working mode, and continues to detect the voltage output to the load under the pulse skipping mode with the feedback terminal.

2. The pulse modulation method of claim 1, wherein if the load is a light load, the PWM controller is capable of turning on a switch to enter the pulse skipping mode.

3. The pulse modulation method of claim 2, wherein the switch is an N-channel MOSFET.

4. The pulse modulation method of claim 1, wherein if the voltage is low, the PWM controller stays under the pulse skipping mode for 32 clock cycles.

5. A pulse modulation method for adjusting pulse signals according to a working voltage of a load, the method comprising:
   providing a PWM controller comprising a first drive terminal, a phase terminal, a second drive terminal, a first switch, a second switch, and a feedback terminal;
   detecting the working voltage of the load by a feedback terminal of the PWM controller;
   determining whether the load is a light load or a heavy load by the PWM controller; and if the load is a heavy load, the PWM controller works under normal working mode, and continues to detect the working voltage of the load;
   if the load is a light load, the PWM controller works under pulse skipping mode, and detects the voltage output to the load under the pulse skipping mode with the feedback terminal;
   ascertaining whether the voltage output to the load under the pulse skipping mode is normal by the PWM controller; and if the voltage output to the load under the pulse skipping mode is normal, the PWM controller stays under the pulse skipping mode, and continues to detect the voltage output to the load under the pulse skipping mode with the feedback terminal;
   wherein if the voltage output to the load under the pulse skipping mode is low, the PWM controller stays under the pulse skipping mode for a number of clock cycles, and continues to detect the voltage output to the load under the pulse skipping mode with the feedback terminal; if the voltage is normal, the PWM controller stays under the pulse skipping mode, and continues to detect the voltage output to the load under the pulse skipping mode with the feedback terminal; and if the voltage is still low, the PWM controller jumps out from the pulse skipping mode to work under the normal working mode, and continues to detect the voltage output to the load under the pulse skipping mode with the feedback terminal.

* * * * *